United States Patent
Xu et al.

(10) Patent No.: US 11,340,395 B2
(45) Date of Patent: May 24, 2022

(54) LIGHT SOURCE, BACKLIGHT MODULE AND MANUFACTURING METHOD THEREOF, AND DISPLAY DEVICE

(71) Applicants: HEFEI BOE DISPLAY LIGHTING CO., LTD., Anhui (CN); BOE TECHNOLOGY GROUP CO., LTD., Beijing (CN)

(72) Inventors: Yong Xu, Beijing (CN); Wenbo Sun, Beijing (CN); Jitai Xia, Beijing (CN); Zungan Ling, Beijing (CN); Xing Wang, Beijing (CN)

(73) Assignees: HEFEI BOE DISPLAY LIGHTING CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 275 days.

(21) Appl. No.: 16/605,631

(22) PCT Filed: Apr. 9, 2019

(86) PCT No.: PCT/CN2019/081945
§ 371 (c)(1),
(2) Date: Oct. 16, 2019

(87) PCT Pub. No.: WO2019/210765
PCT Pub. Date: Nov. 7, 2019

(65) Prior Publication Data
US 2021/0325598 A1    Oct. 21, 2021

(30) Foreign Application Priority Data

May 3, 2018  (CN) .......................... 201820650895.7

(51) Int. Cl.
*F21V 8/00* (2006.01)

(52) U.S. Cl.
CPC ......... *G02B 6/0073* (2013.01); *G02B 6/0055* (2013.01); *G02B 6/0088* (2013.01)

(58) Field of Classification Search
CPC ... G02B 6/0073; G02B 6/0055; G02B 6/0088
See application file for complete search history.

(56) References Cited

U.S. PATENT DOCUMENTS

| 1,664,302 A * | 3/1928 | Garis .................... B60R 13/105 |
| | | 40/205 |
| 9,351,392 B2 | 5/2016 | Lee et al. |

(Continued)

FOREIGN PATENT DOCUMENTS

| CN | 104251420 A * | 12/2014 | ........... G02B 6/0088 |
| CN | 104519662 A * | 4/2015 | ........... H05K 1/0278 |

(Continued)

*Primary Examiner* — Mary Ellen Bowman

(57) ABSTRACT

The present disclosure provides a light source, a backlight module and a manufacturing method thereof and a display device. The light source includes a light-emitting element and a circuit board supplying power for the light-emitting element, the circuit board includes a first bottom plate and a first side plate, the first bottom plate and the first side plate are connected to form a bent shape, and the light-emitting element is arranged on the first side plate and located on an identical side of the first side plate with the first bottom plate.

17 Claims, 3 Drawing Sheets

(56) References Cited

U.S. PATENT DOCUMENTS 9,506,637 B2    11/2016  Park
2015/0003110 A1*  1/2015  Choi .................... G02B 6/0088
                                                            362/612

FOREIGN PATENT DOCUMENTS

| CN | 104519662 A | | 4/2015 | |
|---|---|---|---|---|
| CN | 104848084 A | * | 8/2015 | ....... G02F 1/133603 |
| CN | 104848084 A | | 8/2015 | |
| CN | 204986554 U | | 1/2016 | |
| CN | 107515490 A | | 12/2017 | |
| CN | 208041841 U | | 11/2018 | |

* cited by examiner

LIGHT SOURCE, BACKLIGHT MODULE AND MANUFACTURING METHOD THEREOF, AND DISPLAY DEVICE

TECHNICAL FIELD

The present disclosure relates to a light source, a backlight module and a manufacturing method thereof, and a display device.

BACKGROUND

With development of a display technology, a display device is required to be thinner and thinner; however, a thickness of the display device is affected by a backlight module, and a height of a light source directly affects a thickness of the backlight module.

When the light source is connected to a Printed Circuit Board (PCB), since components, wirings and the like supplying power for the light source need to be arranged in the PCB, a height of the PCB is usually large, which results in that the entire backlight module is thick, and is not conductive to thinning of the display device.

SUMMARY

In a first aspect, an embodiment of the present disclosure provides a light source, the light source comprises a light-emitting element and a circuit board, the circuit board supplies power for the light-emitting element and is formed to have a bent shape, the circuit board includes a first bottom plate and a first side plate, the first bottom plate and the first side plate are connected to form the bent shape, and the light-emitting element is arranged on the first side plate and located on an identical side of the first side plate with the first bottom plate.

For example, in the light source provided by an embodiment of the present disclosure, the first bottom plate and the first side plate are of an integrated structure.

For example, in the light source provided by an embodiment of the present disclosure, the circuit board includes at least one component and a plurality of leads configured to supply power for the light-emitting element, and the at least one component and the plurality of leads are arranged on the first bottom plate.

For example, in the light source provided by an embodiment of the present disclosure, the light-emitting element is an LED chip.

For example, in the light source provided by an embodiment of the present disclosure, the circuit board is an aluminum substrate.

For example, in the light source provided by an embodiment of the present disclosure, a groove is formed in a surface of the first side plate on an identical side with the first bottom plate, and the light-emitting element is arranged in the groove, and is electrically connected with the circuit board through an electrical connection member on a side wall of the groove.

For example, in the light source provided by an embodiment of the present disclosure, the light-emitting element is fixed to a surface of the first side plate on an identical side with the first bottom plate, and is electrically connected with the circuit board through an electrical connection member on the surface.

For example, in the light source provided by an embodiment of the present disclosure, the bent shape is an L shape.

In a second aspect, an embodiment of the present disclosure provides a backlight module, the backlight module comprises: a light source, according to the first aspect; a backboard, the backboard including a second bottom plate and a second side plate, at least a portion of the backboard including a bent structure, and the second bottom plate and the second side plate being connected to form the bent structure; and a light guide plate, a light exiting surface of the light-emitting element and a light incoming surface of the light guide plate being oppositely arranged, the bent shape is connected to the bent structure, the first side plate is connected to the second side plate, and the first bottom plate is connected to the second bottom plate.

For example, the bent shape and the bent structure are identical in shape.

For example, the backlight module provided by an embodiment of the present disclosure further comprises a reflector plate arranged on an opposite side of a light exiting surface of the light guide plate, the second bottom plate further includes a protrusion, and along a light exiting direction of the backlight module, the reflector plate and the light guide plate are sequentially arranged on the protrusion, and in a light exiting direction of the light source, the light exiting surface of the light-emitting element is flush with the light incoming surface of the light guide plate.

For example, in the backlight module provided by an embodiment of the present disclosure, the first bottom plate is located between the second bottom plate and the reflector plate, and a surface of the first bottom plate facing the reflector plate is flush with a surface of the protrusion facing the reflector plate.

For example, in the backlight module provided by an embodiment of the present disclosure, the protrusion includes a protrusion strip extending in a length direction of the light source; or the protrusion includes a plurality of protrusion segments, and the protrusion segments are arranged in the length direction of the light source.

For example, in the backlight module provided by an embodiment of the present disclosure, the first bottom plate and the first side plate are fixed to the backboard through an adhesive tape.

For example, in the backlight module provided by an embodiment of the present disclosure, the adhesive tape is a heat conduction adhesive tape.

For example, in the backlight module provided by an embodiment of the present disclosure, the bent structure of the backboard is an integrated structure.

For example, in the backlight module provided by an embodiment of the present disclosure, the bent structure is in an L shape.

In a third aspect, an embodiment of the present disclosure provides a display device comprising a backlight module according to the second aspect.

In a fourth aspect, an embodiment of the present disclosure provides a manufacturing method of the backlight module according to the second aspect, the manufacturing method comprises: providing the light source; connecting the first side plate to the second side plate, connecting the first bottom plate to the second bottom plate, and making the bent shape connected with the bent structure; and arranging a light guide plate onto the backboard, and making the light exiting surface of the light-emitting element and the light incoming surface of the light guide plate oppositely arranged.

For example, in the manufacturing method of the backlight module provided by an embodiment of the present disclosure, the backlight module further comprises a reflector plate arranged on an opposite side of a light exiting surface of the light guide plate, the backboard further includes a protrusion, in a light exiting direction of the backlight module, the reflector plate and the light guide plate are sequentially arranged on the protrusion; and before arranging the light guide plate onto the backboard, the manufacturing method further comprises: arranging the reflector plate on a surface of the backboard including the protrusion, the protrusion supporting the reflector plate, so that in a light exiting direction of the light source, the light exiting surface of the light-emitting element is flush with the light incoming surface of the light guide plate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Figure 1:
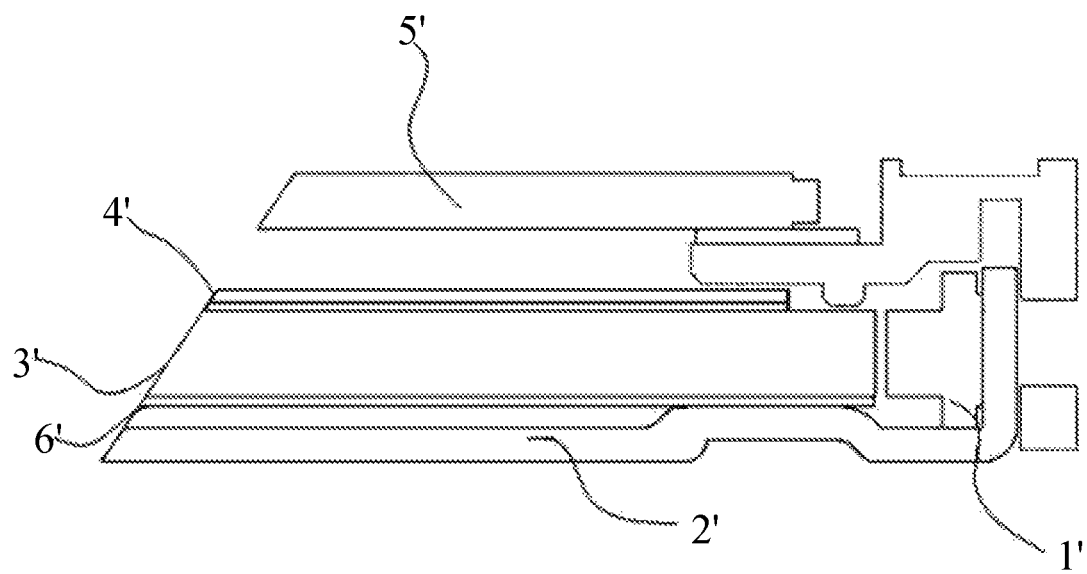
FIG. 1 is a structural schematic diagram of a display device.
Figure 2:
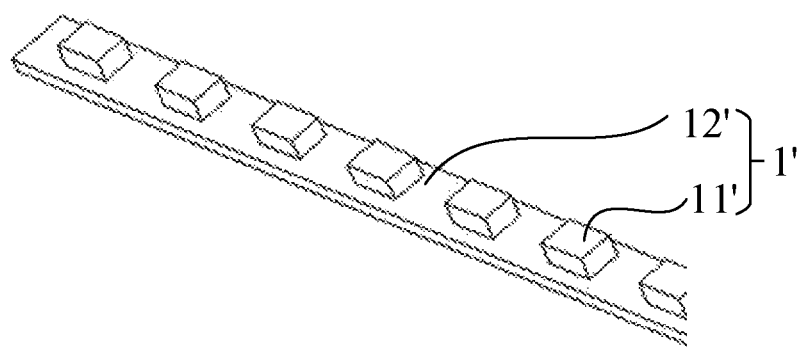
FIG. 2 is a schematic diagram of a light source structure.
Figure 3:
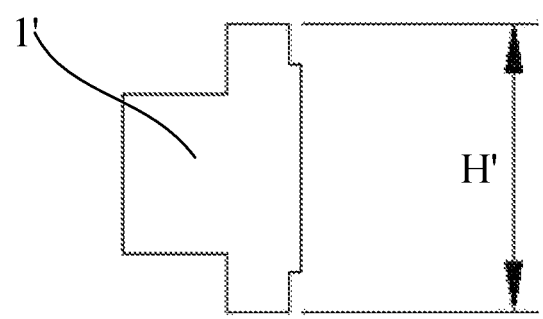
FIG. 3 is a cross-sectional diagram of the light source structure.

As shown in FIG. 1 to FIG. 3, structural schematic diagrams of a display device and a light source are shown. A light source 1', such as an LED lamp strip, is attached to an inner side of a side plate of a backboard 2'. After passing through a light guide plate 3' and an optical film 4', light emitted from a light source 11' of the light source 1' is reflected by a reflector plate 6' to a display panel 5'. Since the light source 1' is limited by a packaging size of the light source and an electrical circuit, a height H' of a Printer Circuit Board (PCB) 12' is usually set to be large.

Alternatively, multiple layers of wirings may be used to reduce the height of the PCB 12', which however requires multiple layers of aluminum substrates for wiring; thus, heat dissipation efficiency is low, and cost is increased.

A light source, a backlight module and a manufacturing method thereof, and a display device of embodiments of the present disclosure are described in detail below in conjunction with the drawings.

An embodiment of the present disclosure provides a light source comprising a light-emitting element and a circuit board; the circuit board is used for supplying power for the light-emitting element, and is formed to have a bent shape; the circuit board includes a first bottom plate and a first side plate, the first bottom plate and the first side plate are connected to form the bent shape, and the light-emitting element is arranged on the first side plate and located on a same side of the first side plate with the first bottom plate.

An embodiment of the present disclosure further provides a backlight module, comprising the light source according to any embodiment of the present disclosure, a backboard and a light guide plate; the backboard includes a second bottom plate and a second side plate and is formed that at least a portion of the backboard includes a bent structure, and the second bottom plate and the second side plate are connected to form the bent structure; a light exiting surface of a light-emitting element and a light incoming surface of the light guide plate are oppositely arranged; the bent shape is connected to the bent structure, and the bent shape and the bent structure are the same in shape; and the first side plate is connected to the second side plate, and the first bottom plate is connected to the second bottom plate.

An embodiment of the present disclosure further provides a display device, comprising the backlight module as mentioned above.

Figure 4:
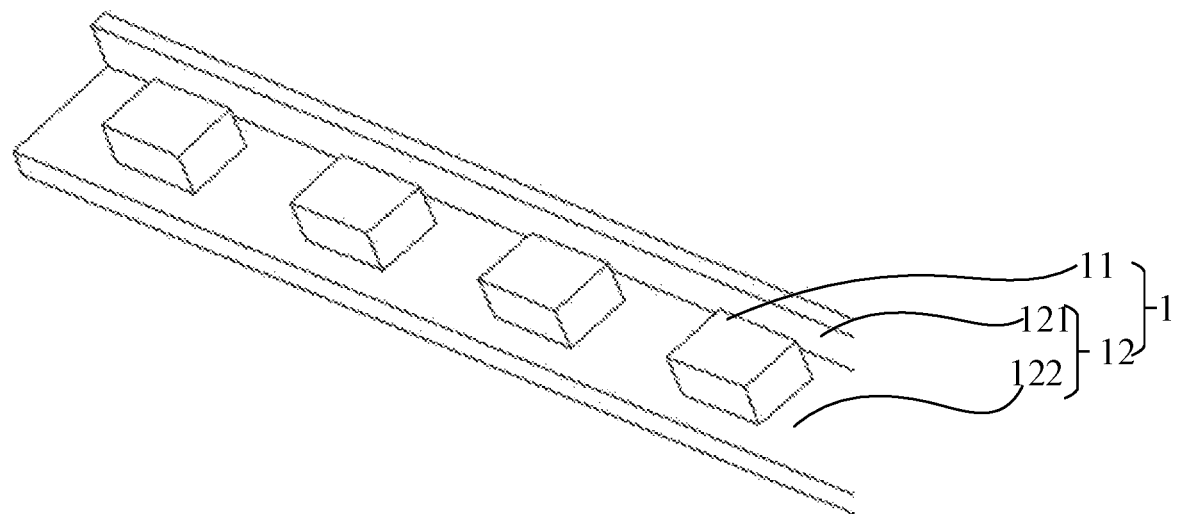
FIG. 4 is a structural schematic diagram of a light source of an embodiment of the present disclosure.
Figure 5:
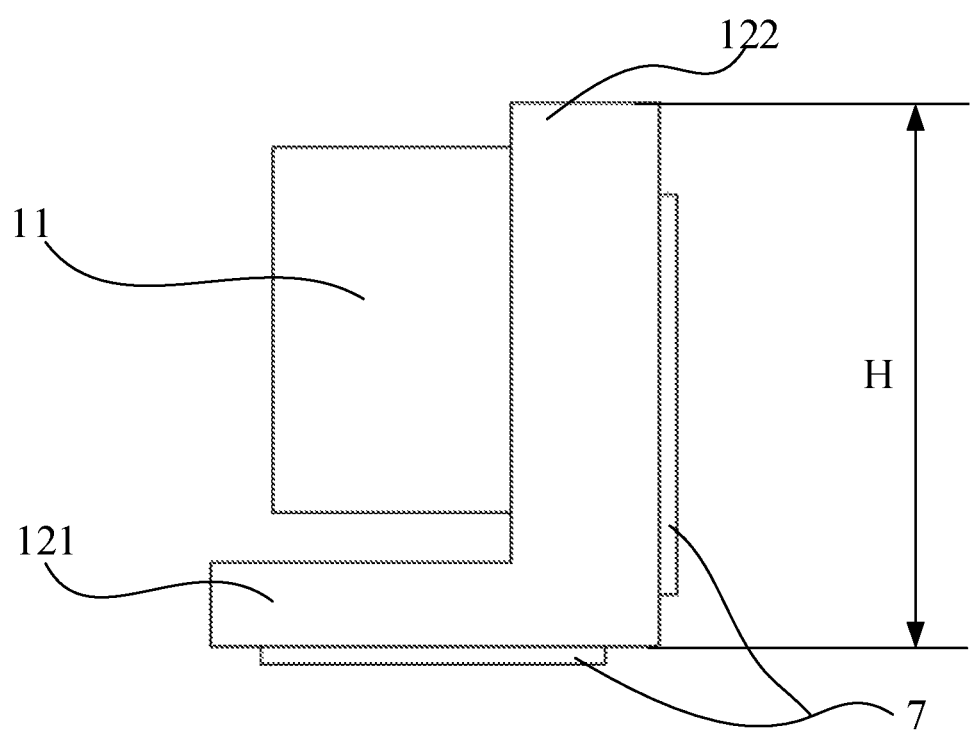
FIG. 5 is a cross-sectional diagram of a light source structure of an embodiment of the present disclosure.

For the light source in the embodiment of the present disclosure, referring to FIG. 4 and FIG. 5, the light source 1 comprises a light-emitting element 11 and a circuit board 12 for supplying power for the light-emitting element 11.

The circuit board 12 is formed to have a bent shape, and includes a first bottom plate 121 and a first side plate 122; and the first bottom plate 121 and the first side plate 122 are connected to form a bent shape. For example, as shown in FIG. 5, the first bottom plate 121 and the first side plate 122 may be connected into an L-shaped structure, and integrally formed as an integrated structure.

For example, the circuit board includes at least one component and a plurality of leads, and the at least one component and the plurality of leads are configured to supply power for the light-emitting element, and are arranged on the first bottom plate.

For example, all the components of the circuit board may be arranged on the first bottom plate, and all the leads or most length of the leads are arranged on the first bottom plate; according to a specific situation, a very small portion of the leads may be arranged on the first side plate, but this does not affect an overall technical effect.

The light-emitting element 11 is connected to, for example attached to the first bottom plate 121 and located on a same side of the first side plate 122 with the first bottom plate 121. No electrical lead is arranged on the first side plate 122, and its height H may be only greater than a height of the light-emitting element 11 by 1 mm or so. When the light source is assembled into the backlight module, the first side plate 122 is attached to the side plate of the backlight module, thus, a height of the first side plate 122 directly affects a thickness of the backlight module, no electrical lead is arranged on the first side plate 122, and an electrical lead of the circuit board 12 is arranged on the first bottom plate 121, which can effectively lower a height of the light source 1, thereby lowering the thickness of the backlight module and the display device. In addition, the circuit board 12 forms the bent structure by adopting the first bottom plate 121 and the first side plate 122, which can increase a heat dissipating area of the light source, thereby prolonging a service life of the light source.

In the light source 1 of the embodiment of the present disclosure, the at least one component and the plurality of leads of the circuit board 12 are arranged on the first bottom plate 121, and the light-emitting element 11 is attached to the first side plate 122; in this way, since no electrical lead is arranged on the first side plate 122 directly relevant to the height of the light source 1, its height is only needed to be slightly greater than the height of the light-emitting element 11, which can effectively lower the height of the light source 1, thereby lowering the thickness of the backlight module and the display device.

For example, a groove is formed in a surface of the first side plate on the same side with the first bottom plate, and the light-emitting element is arranged in the groove, and is electrically connected with the circuit board through an electrical connection member on a side wall of the groove For example, the light-emitting element is fixed to the surface of the first side plate on the same side with the first bottom plate, and is electrically connected with the circuit board through an electrical connection member on the surface.

It should be noted herein that, when the light-emitting element is arranged on the surface of the first side plate on the same side with the first bottom plate, the light-emitting element is needed to be electrically connected to the circuit board, an electrical connection point between the circuit board and the light-emitting element may be located on the first bottom plate, the light-emitting element may be welded to the electrical connection point on the first bottom plate, and the light-emitting element is fixed to the first side plate. Or, the electrical connection point between the circuit board and the light-emitting element may be located on a side of the first side plate close to the first bottom plate, such that only a very short length of wiring is arranged in the first side plate, and an overall effect is not affected.

Or, when the light-emitting element is fixed to the groove in the first side plate, the side wall of the groove may be provided with the electrical connection member, such as a welding pad or a snap-fit electrical connection member, the light-emitting element may welded to the electrical connection member on the side wall, or the light-emitting element may connected to the circuit board by the snap-fit connection; in this case, the electrical connection member on the side wall of the groove may be located on the first side plate, but only a very short length of wiring is arranged in the first side plate, and the overall effect is not affected; or the groove may be opened all the way to the first bottom plate, and the connection member on the side wall of the groove is located on the first bottom plate.

Exemplarily, the light-emitting element 11 may be an LED chip, the light source is an LED strip, the circuit board 12 may be an aluminum substrate, and the aluminum substrate is light, and good in heat dissipating performance, which can enhance heat dissipating performance of the light source.

Figure 6:
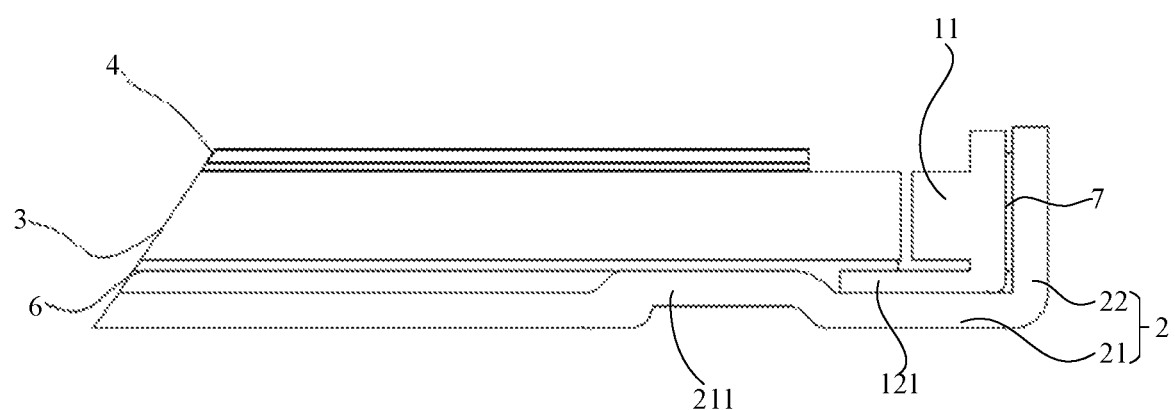
FIG. 6 is a structural schematic diagram of a backlight module of an embodiment of the present disclosure.

The present disclosure further provides a backlight module, referring to FIG. 6, the backlight module comprises the light source 1 according to the above embodiment, a backboard 2 and a light guide plate 3. The backboard 2 includes a second bottom plate 21 and a second side plate 22 and is formed that at least a portion of the backboard 2 includes a bent structure, and the second bottom plate 21 and the second side plate 22 are connected to form the bent structure. A light exiting surface of a light-emitting element and a light incoming surface of the light guide plate are oppositely arranged, the bent shape is connected to the bent structure, the first side plate is connected to the second side plate, and the first bottom plate is connected to the second bottom plate.

For example, as shown in FIG. 6, the second bottom plate 21 and the second side plate 22 may be of an L-shaped structure, and are integrally formed. The backboard 2 includes the second bottom plate and the second side plate, and is formed that at least a portion of the backboard includes a bent structure, the second bottom plate and the second side plate are connected to form the bent structure; and the bent shape is connected to the bent structure, and the bent shape and the bent structure are the same in shape.

For example, the backlight module further comprises a reflector plate 6, arranged on an opposite side of a light exiting surface of the light guide plate, where the second bottom plate 21 further includes a protrusion 211, in a light exiting direction of the backlight module, such as an upward direction in FIG. 6, the reflector plate 6 and the light guide plate are sequentially arranged on the protrusion 211, and in a light exiting direction of the light source, such as a leftward direction in FIG. 6, the light exiting surface of the light-emitting element is flush with the light incoming surface of the light guide plate, which guarantees light exiting efficiency.

For example, a shape of the backboard 2 is consistent with a shape of the circuit board 12, and the bent shape and the bent structure are the same in shape. The first side plate 12 of the light source 1 is attached to the second side plate of the backboard 2, and the first bottom plate 11 of the light source 1 is attached to the second bottom plate 21 of the backboard 2. The light exiting surface of the light-emitting element 11 and the light incoming surface of the light guide plate 3 are oppositely arranged.

For example, the backboard 2, the reflector plate 6, the light guide plate 3 and an optical film 4 are sequentially arranged in a light exiting direction of the backlight module.

Since the reflector plate 6 is located on the protrusion 211, a side of the reflector plate 6 close to the light source 1 is suspended, and the first bottom plate 121 of the circuit board 12 is located between the second bottom plate 21 and the reflector plate 6, which can provide support for the reflector plate 6, and solves a problem of shadow defect due to the fact that the reflector plate 6 is suspended and collapses.

For example, the protrusion may include a protrusion strip extending in a length direction of the light source, such as in a direction perpendicular to a paper surface in FIG. 6, the protrusion strip has a certain width so as to meet a supporting strength requirement; the protrusion strip may be a plurality of strips arranged side by side; or the protrusion includes a plurality of protrusion segments, and the protrusion segments are arranged in the length direction of the light source; or the protrusion includes a plurality of protrusion segment matrixes arranged in the length direction of the light source and perpendicular to the length direction of the light source. The embodiment of the present disclosure is not limited hereto, as long as it can support other structures of the backlight module.

For example, the first bottom plate 121 and the first side plate 122 may be fixed to the backboard 2 by an adhesive tape 7, which may be a thermal conductive adhesive tape. The light source 1 according to the embodiment of the present disclosure may be attached with the thermal conducive tape on both sides, to increase an adhesion area between the light source 1 and the backboard, and increase an adhesion force, and therefore, a thickness of the heat conduction adhesive tape can be lowered, the light source 1 and the backboard 2 are attached more closely, heat of the light-emitting element 11 can be effectively conducted to the backboard 2 for heat dissipation, heat dissipating efficiency of the backlight module is improved, a service life of the backlight module is prolonged, and possibility is provided for the backlight module with an ultrahigh brightness.

An embodiment of the present invention further provides a display device, comprising a backlight module of the above embodiment, and the display device may specifically be any product or part having a display function, such as a mobile phone, a tablet personal computer, a TV set, a display, a notebook computer, a digital photo frame, a navigator and electronic paper.

For example, a display panel of the display device is arranged on a light exiting surface of the backlight module, that is to say, on a light exiting surface of a light guide plate, because the backlight module has a small thickness, a thickness of the whole display device can be decreased.

The light source of the embodiment of the present disclosure, comprises the light-emitting element and the circuit board for supplying power for the light-emitting element, and the circuit board has the bent shape. The first bottom plate and the first side plate are connected to form the bent shape, and the light-emitting element is arranged on the first side plate and arranged on the same side with the first bottom plate. The circuit board in this shape is directly connected with the light-emitting element without providing other parts, which saves space, saves assembling time, and improves efficiency. The component and the electrical lead in the circuit board are arranged on the first bottom plate, the light-emitting element is attached onto the first side plate, in this way, since no electrical lead or only a very small length of the lead is arranged on the first side plate directly relevant to the height of the light source, a height of the first side plate is only needed to be slightly greater than the height of the light-emitting element, which can effectively lower the height of the light source, thereby lowering the thickness of the backlight module and the display device adopting the light source.

An embodiment of the present invention further provides a manufacturing method of any of the backlight modules described above, comprising: providing a light source; connecting a first side plate to a second side plate, connecting a first bottom plate to a second bottom plate, and making a bent shape connected with a bent structure; and arranging a light guide plate onto a backboard, and making a light exiting surface of a light-emitting element and a light incoming surface of the light guide plate oppositely arranged.

For example, the backlight module further comprises a reflector plate, arranged on an opposite side of a light exiting surface of the light guide plate; the backboard further includes a protrusion, and in a light exiting direction of the backlight module, the reflector plate and a backlight plate are sequentially arranged on the protrusion; before arranging the light guide plate onto the backboard, the manufacturing method further comprises: arranging the reflector plate on a surface of the backboard including the protrusion, the protrusion supporting the reflector plate, so that in a light exiting direction of the light source, the light exiting surface of a light-emitting element is flush with the light incoming surface of the light guide plate, thus the light exiting efficiency is guarded.

Embodiments of the present disclosure are described in a progressive way, and in each embodiment, the difference point of the embodiment with other embodiments is emphatically explained, and the same or similar portion of the embodiments may be referred to each other. For the system embodiment, due to being substantially similar with the method embodiment, it is simply described and the relevant portion may refer to the partial description of the method embodiment.

For the present disclosure, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness of a layer or a region may be enlarged or reduced, that is, the accompanying drawings are not drawn according to the actual scale.

(3) In case of no conflict, features in one embodiment or in different embodiments can be combined to obtain a new embodiment.

What are described above is related to the specific embodiments of the disclosure only and not limitative to the scope of the disclosure. The protection scope of the disclosure shall be based on the protection scope of the claims.

The application claims priority to the Chinese patent application No. 201820650895.7 filed May 3, 2018, the disclosure of which is incorporated herein by reference as part of the application.

The invention claimed is:

1. A backlight module, comprising:
a light source, comprising:
a light-emitting element; and
a circuit board, supplying power for the light-emitting element, and being formed to have a bent shape;
wherein the circuit board includes a first bottom plate and a first side plate, the first bottom plate and the first side plate are connected to form the bent shape, and the light-emitting element is arranged on the first side plate and located on an identical side of the first side plate with the first bottom plate;
a backboard, the backboard including a second bottom plate and a second side plate, at least a portion of the backboard including a bent structure, and the second bottom plate and the second side plate being connected to form the bent structure;

a light guide plate, a light exiting surface of the light-emitting element and a light incoming surface of the light guide plate being oppositely arranged; and a reflector plate, arranged on an opposite side of a light exiting surface of the light guide plate, wherein the bent shape is connected to the bent structure, the first side plate is connected to the second side plate, and the first bottom plate is connected to the second bottom plate, wherein the second bottom plate further includes a protrusion, and along a light exiting direction of the backlight module, the reflector plate and the light guide plate are sequentially arranged on the protrusion, in a light exiting direction of the light source, the light exiting surface of the light-emitting element is flush with the light incoming surface of the light guide plate, wherein the first bottom plate is located between the second bottom plate and the reflector plate, and a surface of the first bottom plate on which the reflector plate is arranged is flush with a surface of the protrusion facing the reflector plate, and the protrusion and the backboard are of an integrated structure.

2. The backlight module according to claim 1, wherein the protrusion includes a protrusion strip extending in a length direction of the light source; or the protrusion includes a plurality of protrusion segments, and the protrusion segments are arranged in the length direction of the light source.

3. The backlight module according to claim 1, wherein the first bottom plate and the first side plate are fixed to the backboard through an adhesive tape.

4. The backlight module according to claim 3, wherein the adhesive tape is a heat conduction adhesive tape.

5. The backlight module according to claim 1, wherein the bent structure of the backboard is an integrated structure.

6. The backlight module according to claim 5, wherein the bent structure is in an L shape.

7. The backlight module according to claim 1, wherein the bent shape and the bent structure are identical in shape.

8. A display device, comprising:
a backlight module, according to claim 1.

9. A manufacturing method of the backlight module according to claim 1, comprising:
providing the light source, comprising:
a light-emitting element; and
a circuit board, supplying power for the light-emitting element, and being formed to have a bent shape;
wherein the circuit board includes a first bottom plate and a first side plate, the first bottom plate and the first side plate are connected to form the bent shape, and the light-emitting element is arranged on the first side plate and located on an identical side of the first side plate with the first bottom plate;
connecting the first side plate to the second side plate, connecting the first bottom plate to the second bottom plate, and making the bent shape connected with the bent structure;
arranging a light guide plate onto the backboard, and making the light exiting surface of the light-emitting element and the light incoming surface of the light guide plate oppositely arranged;

disposing the reflector plate on an opposite side of a light exiting surface of the light guide plate, wherein the second bottom plate further includes a protrusion, and along a light exiting direction of the backlight module, the reflector plate and the light guide plate are sequentially arranged on the protrusion, in a light exiting direction of the light source, the light exiting surface of the light-emitting element is flush with the light incoming surface of the light guide plate, wherein the first bottom plate is located between the second bottom plate and the reflector plate, and a surface of the first bottom plate on which the reflector plate is arranged is flush with a surface of the protrusion facing the reflector plate, and the protrusion and the backboard are of an integrated structure.

10. The manufacturing method of the backlight module according to claim 9, wherein the backlight module further comprises a reflector plate arranged on an opposite side of a light exiting surface of the light guide plate, the backboard further includes a protrusion,
in a light exiting direction of the backlight module, the reflector plate and the light guide plate are sequentially arranged on the protrusion;
before arranging the light guide plate onto the backboard, the manufacturing method further comprises:
arranging the reflector plate on a surface of the backboard including the protrusion, the protrusion supporting the reflector plate, so that in a light exiting direction of the light source, the light exiting surface of the light-emitting element is flush with the light incoming surface of the light guide plate.

11. The backlight module according to claim 1, wherein the first bottom plate and the first side plate are of an integrated structure.

12. The backlight module according to claim 1, wherein the circuit board includes:
at least one component and a plurality of leads, configured to supply power for the light-emitting element,
the at least one component and the plurality of leads are arranged on the first bottom plate.

13. The backlight module according to claim 1, wherein the light-emitting element is an LED chip.

14. The backlight module according to claim 1, wherein the circuit board is an aluminum substrate.

15. The backlight module according to claim 1, wherein a groove is formed in a surface of the first side plate on an identical side with the first bottom plate, and the light-emitting element is arranged in the groove, and is electrically connected with the circuit board through an electrical connection member on a side wall of the groove.

16. The backlight module according to claim 1, wherein the light-emitting element is fixed to a surface of the first side plate on an identical side with the first bottom plate, and is electrically connected with the circuit board through an electrical connection member on the surface.

17. The backlight module according to claim 1, wherein the bent shape is an L shape.

* * * * *